(12) United States Patent
Ghose et al.

(10) Patent No.: US 11,153,500 B2
(45) Date of Patent: Oct. 19, 2021

(54) AUTO EXPOSURE USING MULTIPLE CAMERAS AND MAP PRIOR INFORMATION

(71) Applicant: GM CRUISE HOLDINGS LLC, San Francisco, CA (US)

(72) Inventors: Shiva Ghose, Berkeley, CA (US); Matthias Wisniowski, Vienna (AT)

(73) Assignee: GM Cruise Holdings, LLC, San Francisco, CA (US)

( * ) Notice: Subject to any disclaimer, the term of this patent is extended or adjusted under 35 U.S.C. 154(b) by 0 days.

(21) Appl. No.: 16/730,640

(22) Filed: Dec. 30, 2019

(65) Prior Publication Data

US 2021/0203828 A1 Jul. 1, 2021

(51) Int. Cl.
*H04N 5/235* (2006.01)
*G05D 1/00* (2006.01)
*H04N 5/232* (2006.01)
*H04N 5/247* (2006.01)

(52) U.S. Cl.
CPC ......... *H04N 5/2352* (2013.01); *G05D 1/0088* (2013.01); *G05D 1/0094* (2013.01); *H04N 5/2351* (2013.01); *H04N 5/23203* (2013.01); *H04N 5/23218* (2018.08); *H04N 5/247* (2013.01); *G05D 2201/0213* (2013.01)

(58) Field of Classification Search
CPC ............... G05D 1/0088; G05D 1/0246; G05D 2201/0213; G05D 1/0274; G06K 9/00791; G06K 9/00798; G06K 9/00805; G06T 2207/30252; G06T 7/73; G06T 7/74; G06T 7/70; G06T 2207/30244; G01C 21/32; H04N 5/2353
See application file for complete search history.

(56) References Cited

U.S. PATENT DOCUMENTS

2019/0243376 A1* 8/2019 Davis ..................... H04N 5/247

* cited by examiner

*Primary Examiner* — Farhan Mahmud
(74) *Attorney, Agent, or Firm* — Polsinelli, PC (57) ABSTRACT

The subject disclosure relates to techniques for adjusting an exposure setting. A process of the disclosed technology can include steps for determining a localization parameter of an autonomous vehicle, the localization parameter including a geographic position of the autonomous vehicle, determining a region of interest based on the localization parameter of the autonomous vehicle, receiving a first image including the region of interest based on the localization parameter of the autonomous vehicle, determining an exposure setting for the region of interest in the first image, and adjusting an exposure setting of the first image to the exposure setting for the region of interest in the first image. Systems and machine-readable media are also provided.

18 Claims, 4 Drawing Sheets

AUTO EXPOSURE USING MULTIPLE CAMERAS AND MAP PRIOR INFORMATION

BACKGROUND

1. Technical Field

The subject technology provides solutions for adjusting an exposure setting and in particular, for adjusting an exposure setting based on a region of interest.

2. Introduction

Overexposure and underexposure is an ongoing issue for image processing systems. As a point of focus of a camera changes or the amount of light suddenly increases or decreases, the corresponding image can be negatively affected by the change in light exposure. Typically, exposure algorithms attempt to minimize the contrast between the brightest and darkest points to obtain the best image. The entire viewing screen is affected by the change in light exposure, thereby rendering a point of focus not viewable because of the over/underexposure of the viewable area. In conventional workflows, users are typically responsible for identifying the point of focus and for determining which area of the screen to compensate for exposure across the entire image without consideration of the present environment.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for improvements in the adjustment of exposure settings. In some examples, a computer-implemented method for adjusting an exposure setting can include determining a localization parameter of an autonomous vehicle, the localization parameter including a geographic position of the autonomous vehicle. The method also can include determining a region of interest based on the localization parameter of the autonomous vehicle. The method further can include receiving a first image including the region of interest based on the localization parameter of the autonomous vehicle. The method also can include determining an exposure setting for the region of interest in the first image. The method further can include adjusting an exposure setting of the first image to the exposure setting for the region of interest in the first image.

Figure 1:
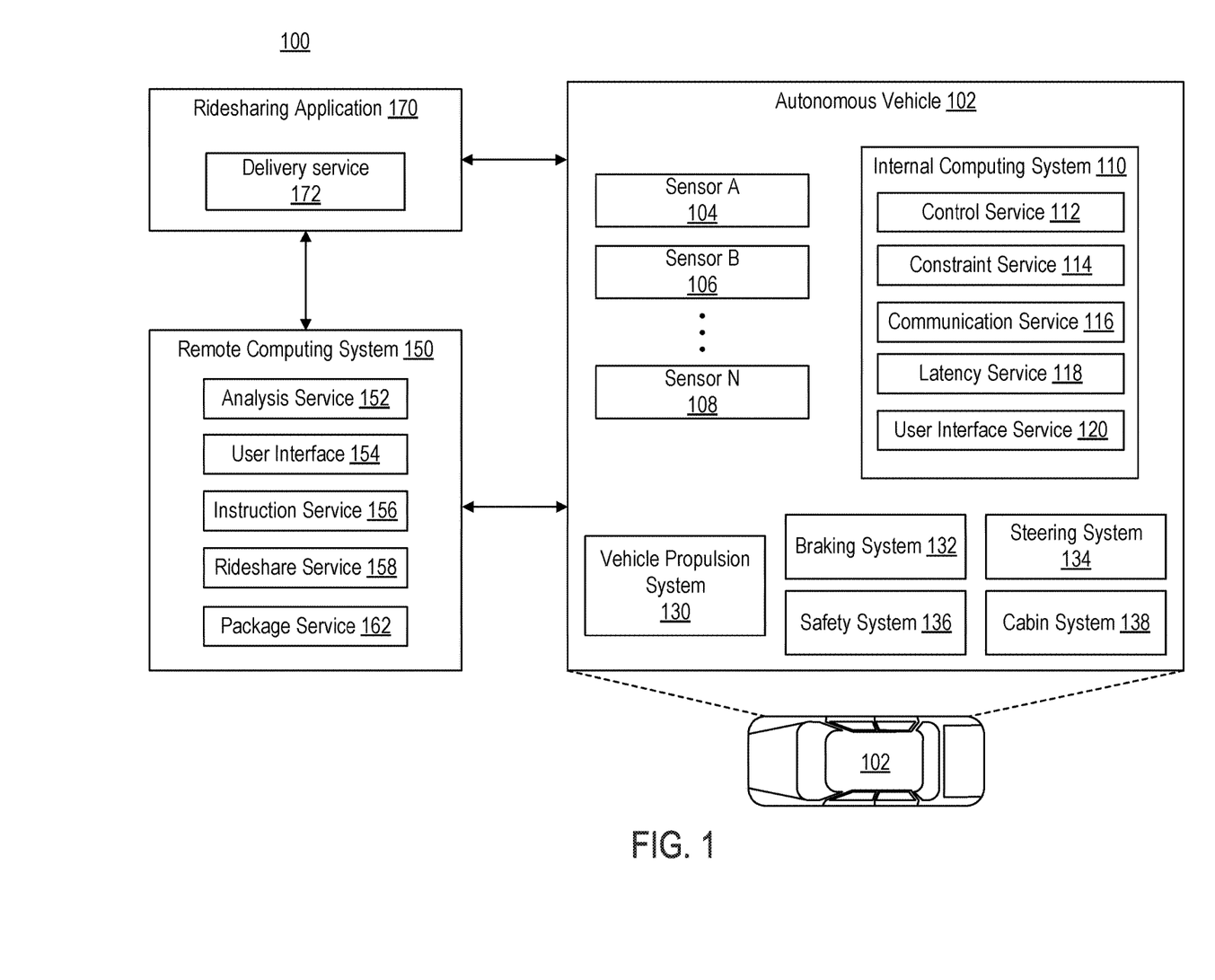
FIG. 1 illustrates an example environment that includes an autonomous vehicle in communication with a remote computing system, according to some aspects of the disclosed technology.

FIG. 1 illustrates an example autonomous vehicle environment 100. The example autonomous vehicle environment 100 includes an autonomous vehicle 102, a remote computing system 150, and a ridesharing application 170. The autonomous vehicle 102, remote computing system 150, and ridesharing application 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The sensors 104-108 on the autonomous vehicle 102 can include one or more types of sensors and can be arranged about the autonomous vehicle 102. For example, the sensors 104-108 can include, without limitation, one or more inertial measuring units (IMUs), one or more image sensors (e.g., visible light image sensors, infrared image sensors, video camera sensors, surround view camera sensors, etc.), one or more light emitting sensors, one or more global positioning system (GPS) devices, one or more radars, one or more light detection and ranging sensors (LIDARs), one or more sonars, one or more accelerometers, one or more gyroscopes, one or more magnetometers, one or more altimeters, one or more tilt sensors, one or more motion detection sensors, one or more light sensors, one or more audio sensors, etc. In some implementations, sensor 104 can be a radar, sensor 106 can be a first image sensor (e.g., a visible light camera), and sensor 108 can be a second image sensor (e.g., a thermal camera). Other implementations can include any other number and type of sensors.

The autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, etc.

The autonomous vehicle 102 can include an internal computing system 110 in communication with the sensors 104-108 and the systems 130, 132, 134, 136, and 138. The internal computing system 110 includes one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface that provides cellular (long-term evolution (LTE), 3rd Generation (3G), 5th Generation (5G), etc.) communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to the autonomous vehicle 102 regarding destinations, requested routes, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing devices, such as tablet computers, laptop computers, smartphones, head-mounted displays (HMDs), gaming systems, servers, smart devices, smart wearables, and/or any other computing devices. In some cases, such computing devices can be passenger computing devices. The rideshare service 158 can receive from passenger ridesharing app 170 requests, such as user requests to be picked up or dropped off, and can dispatch autonomous vehicle 102 for a requested trip.

The rideshare service 158 can also act as an intermediary between the ridesharing app 170 and the autonomous vehicle 102. For example, rideshare service 158 can receive from a passenger instructions for the autonomous vehicle 102, such as instructions to go around an obstacle, change routes, honk the horn, etc. The rideshare service 158 can provide such instructions to the autonomous vehicle 102 as requested.

The remote computing system 150 can also include a package service 162 configured to interact with the ridesharing application 170 and/or a delivery service 172 of the ridesharing application 170. A user operating ridesharing application 170 can interact with the delivery service 172 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 172 to provide a package identifier to the user for package labeling and tracking. Package delivery service 172 can also inform a user of where to bring their labeled package for drop off. In some examples, a user can request the autonomous vehicle 102 come to a specific location, such as the user's location, to pick up the package. While delivery service 172 has been shown as part of the ridesharing application 170, it will be appreciated by those of ordinary skill in the art that delivery service 172 can be its own separate application.

One beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Figure 2:
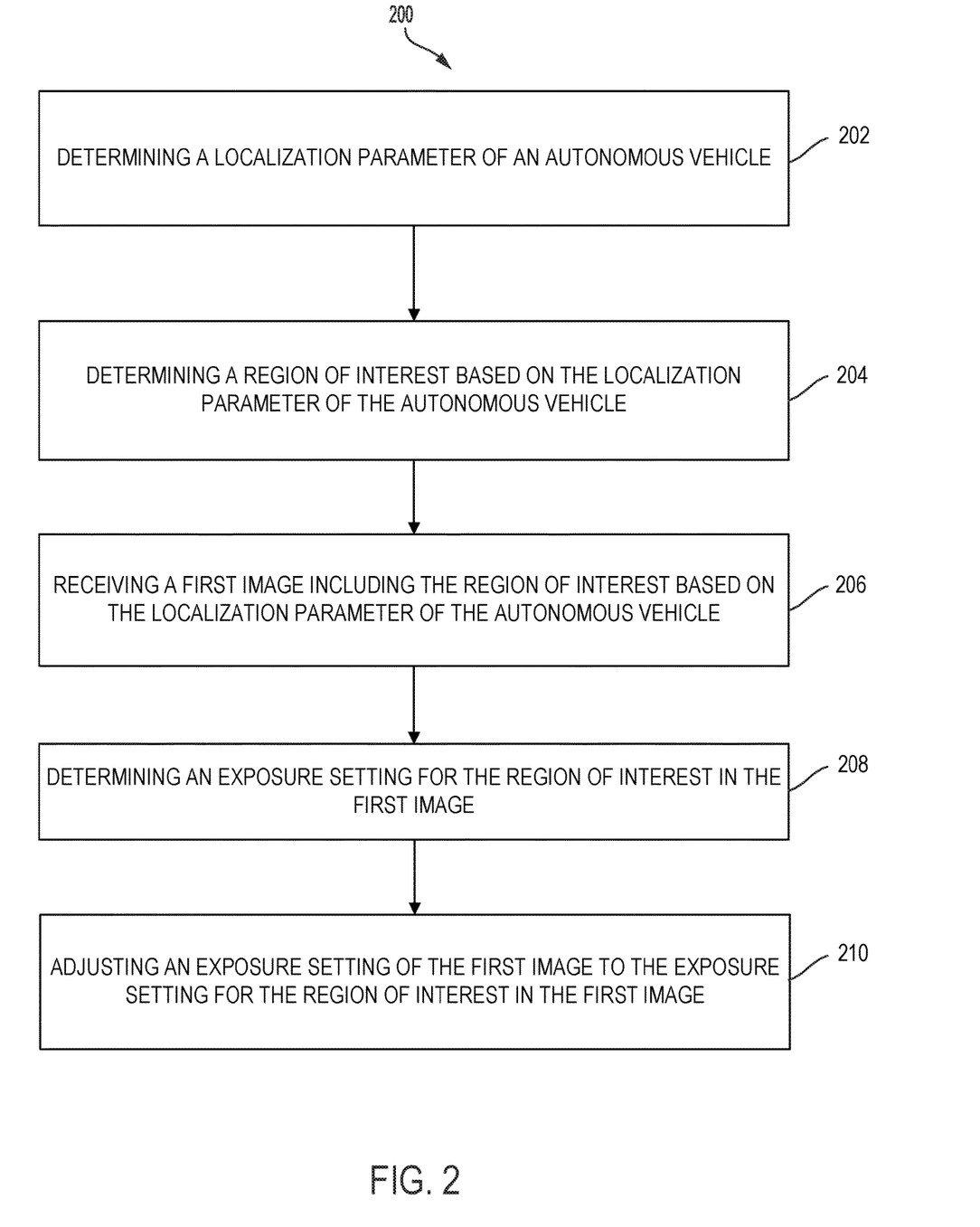
FIG. 2 illustrates an example process for adjusting an exposure setting, according to some aspects of the disclosed technology.
Figure 3:
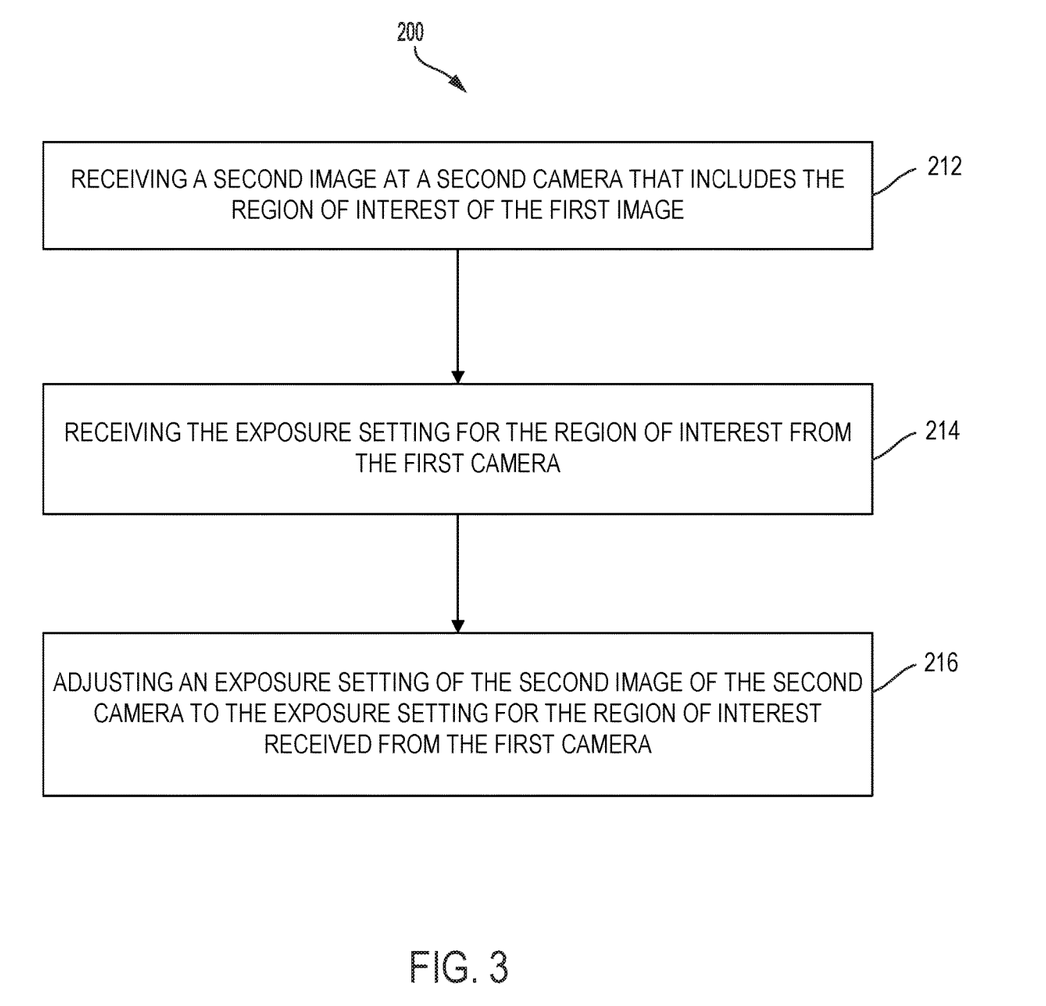
FIG. 3 illustrates an example process for adjusting an exposure setting based on multiple cameras, according to some aspects of the disclosed technology.

Having disclosed some example system components and concepts, the disclosure now turns to FIGS. 2 and 3, which illustrate example method 200 for adjusting an exposure setting based on a region of interest. The steps outlined herein are exemplary and can be implemented in any combination thereof, including combinations that exclude, add, or modify certain steps.

At step 202, the method 200 can include determining a localization parameter of an autonomous vehicle 102. The localization parameter can assist in determining when and where light (e.g., sunlight or artificial light) is directed at the autonomous vehicle 102. For example, the localization parameter can include information of a locality of the autonomous vehicle 102 (e.g., a map of the general vicinity), a geographic position of the autonomous vehicle 102, a direction of light rays, geographic positions of structures (e.g., buildings), or any other locality information suitable for the intended purpose and understood by a person of ordinary skill in the art.

In some implementations, the localization parameter of the autonomous vehicle 102 can utilize high definition maps, LiDAR sensor output, vision, and other sensors to determine current parameters (e.g., x, y, z, r, p, and yw) of the autonomous vehicle 102. The method 200 further can include utilizing localization, a pre-existing map, a current map, tracked objects (e.g., preloaded object or currently tracked objects), and regions of interest (ROI) based on sensors (such as LiDAR, other cameras, ultrasonics, etc.).

In some cases, as the autonomous vehicle 102 moves from a first position to a second position, the amount of sunlight directed at the autonomous vehicle 102 can change abruptly (e.g., the autonomous vehicle 102 exits a shadow of a building). In some instances, the autonomous vehicle 102 can be preloaded with map information such that the autonomous vehicle 102 is made aware of the direction and amount of sunlight that are directed towards mounted cameras of the autonomous vehicle 102. In anticipation of a change in sunlight exposure, the cameras of the autonomous vehicle 102 can prepare for adjusting an exposure setting of the cameras accordingly to minimize "white out," where the image is too bright or too dark to distinguish objects in the image.

Previously, if the autonomous vehicle 102 exited the shadow of the building into direct sunlight, the camera would adjust the exposure setting for the increase in light, thereby whiting out the entire image. In this case, the autonomous vehicle 102 would be unable to detect and distinguish traffic lights because the entire image has been whited out.

Present embodiments solve this problem as the autonomous vehicle 102 can be made aware of its geographic position (e.g., with a global positioning system device) with localization information. With its geographic position, the autonomous vehicle 102 can relatively know the amount of sunlight and the direction of the sunlight rays to then determine whether to adjust the exposure setting on its cameras.

At step 204, the method 200 can include determining a region of interest based on the localization parameter of the autonomous vehicle 102. In some embodiments, the autonomous vehicle 102 can focus on specific regions of the environment to determine how to adjust the exposure setting on its cameras. In some instances, the region of interest can include a street surface (e.g., pavement, road, street, tarmac, etc.), a sidewalk (e.g., crosswalk, side pavement/concrete area, etc.), a traffic sign (e.g., traffic light, stop sign, pedestrian signs, etc.), a pedestrian (e.g., a pedestrian or cyclist crossing the street), or any other region of interest suitable for the intended purpose and understood by a person of ordinary skill in the art. The regions of interests also can be detectable regions of the above-mentioned examples such as clothes of a pedestrian, a reflector jacket of a cyclist, color-type of a sidewalk, or any other detectable region suitable for the intended purpose and understood by a person of ordinary skill in the art.

In some implementations, the regions of interest also can have a priority to determine which region of interest has precedence. For example, a pedestrian can have a higher priority than a sidewalk. As such, the autonomous vehicle 102 can adjust the exposure setting of its cameras to focus on the pedestrian rather than the sidewalk (i.e., the exposure setting can be corrected for the pedestrian and not the sidewalk).

At step 206, the method 200 can include receiving a first image including the region of interest based on the localization parameter of the autonomous vehicle 102. In some instances, the image can be of an intersection and the region of interest can be a traffic light near the geographic position of the autonomous vehicle 102. The image can be captured by a camera mounted on the autonomous vehicle 102.

At step 208, the method 200 can include determining an exposure setting for the region of interest in the first image. For example, if a sidewalk is the region of interest, the internal computing system 110 of the autonomous vehicle 102 can determine the appropriate exposure setting (e.g., between the lightest and darkest setting) for the sidewalk such that the sidewalk is appropriately viewable by the camera.

At step 210, the method 200 can include adjusting an exposure setting of the first image to the exposure setting for the region of interest in the first image. The adjusting of the exposure setting of the first image can occur automatically after the determining of the exposure setting for the region of interest in the first image. In contrast to other methods that require a user to select a region to focus the camera, the method 200 can be utilized by the autonomous vehicle 102 that may require near instantaneous feedback and adjustments to provide a safe driving experience. The internal computing system 110 of the autonomous vehicle 102 can be configured to adjust the exposure settings of images captured by cameras or sensors of the autonomous vehicle 102.

In some instances, the adjustment of the exposure setting of the first image may disregard potential exposure settings for portions of the image that are not the region of interest. This may be the case because portions of the image that are not the region of interest may be of less importance, such as the sky. If the camera adjusted the exposure setting to focus on the sky, the entire image would become too dark to view objects in the image. In some cases, the region of interest may take precedence over other regions because the region of interest may be critical to providing a safe driving experience.

In some implementations, the adjusting of the exposure setting of the first image can adjust a portion of the first image to the exposure setting for the region of interest, rather than the entire image. In such cases, the image may include regions with different exposure settings to provide the most viewable image for the autonomous vehicle 102.

At step 212, the method 200 can include receiving a second image at a second camera that includes the region of interest of the first image. In some instances, a portion of the region of interest can be detectable in the first image and the second image at a first time period (i.e., at the same time).

In some implementations, the first camera may be mounted on a side region of the autonomous vehicle 102, while the second camera may be mounted on a front region of the autonomous vehicle 102. In the instance where a cyclist (i.e., region of interest) proceeds past the autonomous vehicle 102, the cyclist may first appear in the range of the side camera, but as the cyclist continues to pass the autonomous vehicle 102, the cyclist may eventually also appear in the range of the front camera. In this instance, the image of the front camera includes the same region of interest as the side camera of the autonomous vehicle 102.

At step 214, the method 200 can include receiving the exposure setting for the region of interest from the first camera. In some instances, the same exposure setting for the region of interest for both cameras may be preferred for the autonomous vehicle 102. For example, as the cyclist passes both cameras, if the front camera has a different exposure setting than the side camera, the front camera may be overexposed or underexposed thereby potentially being unable to "see" the cyclist pedaling by the autonomous vehicle 102. However, if the exposure setting for the cyclist is substantially the same for both cameras, then the transition of the cyclist from the side camera to the front camera can be even.

At step 216, the method 200 can include adjusting an exposure setting of the second image of the second camera to the exposure setting for the region of interest received from the first camera. By adjusting the exposure setting of the second image of the second camera, there may be continuity between the first and second camera such that the transition of the region of interest between the two cameras is even and readily perceptible by the autonomous vehicle 102.

Figure 4:
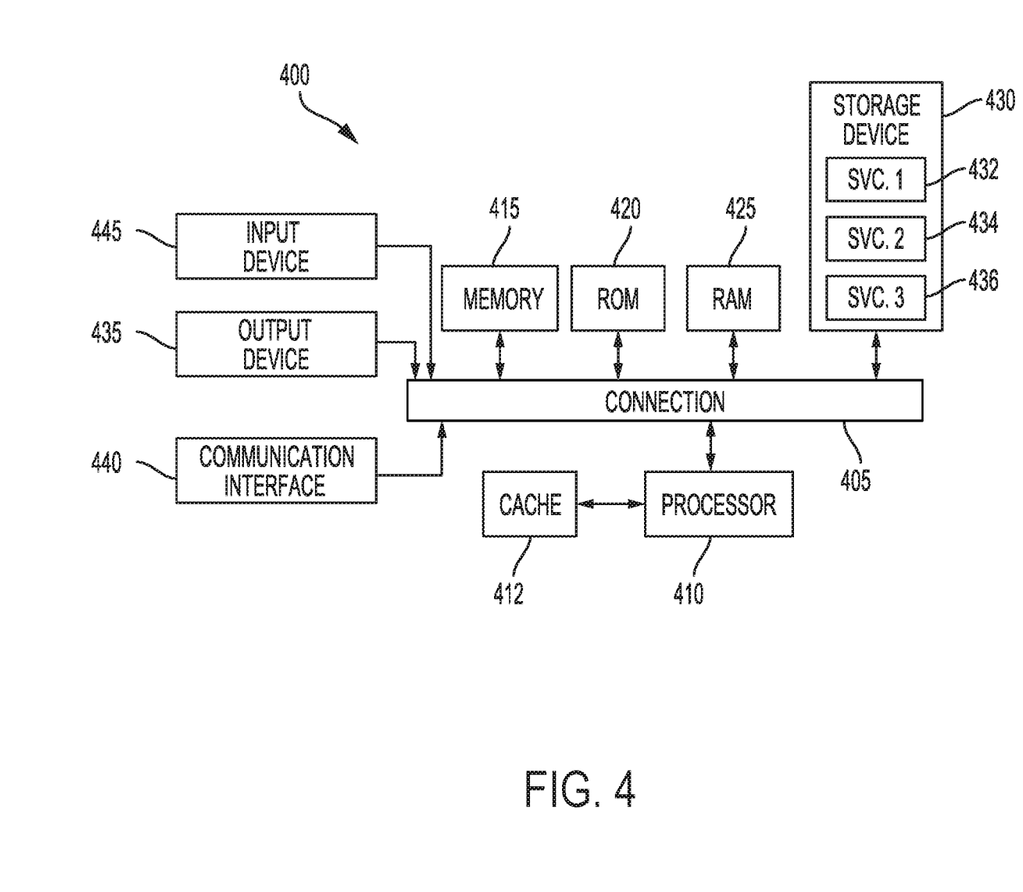
FIG. 4 illustrates an example processor-based system with which some aspects of the subject technology can be implemented.

FIG. 4 illustrates an example computing system 400 which can be, for example, any computing device making up internal computing system 110, remote computing system 150, a passenger device executing rideshare application 170, or any other computing device. In FIG. 4, the components of the computing system 400 are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method for adjusting an exposure setting, the method comprising:
   determining a localization parameter of an autonomous vehicle along a predetermined path of travel, the localization parameter including a geographic position of the autonomous vehicle;
   determining geographic positions of structures and direction of sunlight proximate to the geographic position of the autonomous vehicle along the predetermined path of travel;
   determining shadows cast by the structures and the sunlight that overshadow a region of interest along the predetermined path of travel of the autonomous vehicle prior to the autonomous vehicle entering a region of the shadows cast by the structures that overshadow the region of interest;
   determining an exposure setting of a first camera for the region of interest based on the shadows cast by the structures and the sunlight that overshadow the region of interest and a directional orientation of the first camera prior to the autonomous vehicle entering the region of the shadows cast by the structures and the sunlight that overshadow the region of interest; and
   adjusting a first image of the first camera to the determined exposure setting for the region of interest based on the shadows cast by the structures and the sunlight that overshadow the region of interest and the directional orientation of the first camera proximate to the autonomous vehicle entering the region of the shadows cast by the structures and the sunlight that overshadow the region of interest.

2. The computer-implemented method of claim 1, wherein the localization parameter further includes at least one of a preloaded map, a current map, and a tracked object, and
   wherein the tracked object and the region of interest are based on information received from at least one sensor.

3. The computer-implemented method of claim 1, wherein the region of interest includes a detectable region of at least one of a street surface, a sidewalk, a traffic sign, and a pedestrian.

4. The computer-implemented method of claim 1, wherein the adjusting of the first image occurs automatically after the determining of the exposure setting of the first camera for the region of interest.

5. The computer-implemented method of claim 1, further comprising:
   receiving a second image at a second camera that includes the region of interest of the first image;
   receiving the exposure setting for the region of interest from the first camera; and
   adjusting the second image of the second camera to the exposure setting for the region of interest received from the first camera.

6. The computer-implemented method of claim 5, wherein a portion of the region of interest is detectable in the first image and the second image at a first time period.

7. The computer-implemented method of claim 1, wherein the adjusting of the first image adjusts only a portion of the first image to the exposure setting for the region of interest.

8. A system for adjusting an exposure setting, the system comprising:
   one or more processors; and
   a computer-readable medium comprising instructions stored therein, which when executed by the processors, cause the processors to perform operations comprising:

determining a localization parameter of an autonomous vehicle along a predetermined path of travel, the localization parameter including a geographic position of the autonomous vehicle;

determining geographic positions of structures and direction of sunlight proximate to the geographic position of the autonomous vehicle along the redetermined bath of travel;

determining shadows cast by the structures and the sunlight that overshadow a region of interest along the predetermined path of travel of the autonomous vehicle prior to the autonomous vehicle entering a region of the shadows cast by the structures that overshadow the region of interest;

determining an exposure setting of a first camera for the region of interest based on the shadows cast by the structures and the sunlight that overshadow the region of interest and a directional orientation of the first camera prior to of the autonomous vehicle entering the region of the shadows cast by the structures and the sunlight that overshadow the region of interest; and adjusting a first image of the first camera to the determined exposure setting for the region of interest based on the shadows cast by the structures and the sunlight that overshadow the region of interest and the directional orientation of the first camera proximate to the autonomous vehicle entering the region of the shadows cast by the structures and the sunlight that overshadow the region of interest.

9. The system of claim 8, wherein the localization parameter further includes at least one of a preloaded map, a current map, and a tracked object, and wherein the tracked object and the region of interest are based on information received from at least one sensor.

10. The system of claim 8, wherein the region of interest includes a detectable region of at least one of a street surface, a sidewalk, a traffic sign, and a pedestrian.

11. The system of claim 8, wherein the adjusting of the first image occurs automatically after the determining of the exposure setting of the first camera for the region of interest.

12. The system of claim 8, wherein the instructions stored therein, which when executed by the processors, cause the processors to further perform operations comprising:

receiving a second image at a second camera that includes the region of interest of the first image;

receiving the exposure setting for the region of interest from the first camera; and adjusting the second image of the second camera to the exposure setting for the region of interest received from the first camera.

13. The system of claim 12, wherein a portion of the region of interest is detectable in the first image and the second image at a first time period.

14. The system of claim 8, wherein the adjusting of the first image adjusts only a portion of the first image to the exposure setting for the region of interest.

15. A non-transitory computer-readable storage medium comprising instructions stored therein, which when executed by one or more processors, cause the processors to perform operations comprising:

determining a localization parameter of an autonomous vehicle along a predetermined path of travel, the localization parameter including a geographic position of the autonomous vehicle;

determining geographic positions of structures and direction of sunlight proximate to the geographic position of the autonomous vehicle along the predetermined path of travel;

determining shadows cast by the structures and the sunlight that overshadow a region of interest along the predetermined path of travel of the autonomous vehicle prior to the autonomous vehicle entering a region of the shadows cast by the structures that overshadow the region of interest;

determining an exposure setting of a first camera for the region of interest based on the shadows cast by the structures and the sunlight that overshadow the region of interest and a directional orientation of the first camera prior to the autonomous vehicle entering the region of the shadows cast by the structures and the sunlight that overshadow the region of interest; and adjusting a first image of the first camera to the determined exposure setting for the region of interest based on the shadows cast by the structures and the sunlight that overshadow the region of interest and the directional orientation of the first camera proximate to the autonomous vehicle entering the region of the shadows cast by the structures and the sunlight that overshadow the region of interest.

16. The non-transitory computer-readable storage medium of claim 15, wherein the localization parameter further includes at least one of a preloaded map, a current map, and a tracked object, and wherein the tracked object and the region of interest are based on information received from at least one sensor.

17. The non-transitory computer-readable storage medium of claim 15, wherein the adjusting of the first image occurs automatically after the determining of the exposure setting of the first camera for the region of interest.

18. The non-transitory computer-readable storage medium of claim 15, wherein the instructions stored therein, which when executed by the one or more processors, cause the processors to further perform operations comprising:

receiving a second image at a second camera that includes the region of interest of the first image;

receiving the exposure setting for the region of interest from the first camera; and adjusting the second image of the second camera to the exposure setting for the region of interest received from the first camera.

* * * * *